(12) United States Patent
Gretz

(10) Patent No.: US 9,553,415 B1
(45) Date of Patent: Jan. 24, 2017

(54) DUPLEX ELECTRICAL CONNECTOR WITH ONE-PIECE CONNECTOR BODY AND RADIUS CAST ON TRANSITION

(71) Applicant: Arlington Industries, Inc., Scranton, PA (US)

(72) Inventor: Thomas J. Gretz, Delray Beach, FL (US)

(73) Assignee: ARLINGTON INDUSTRIES, INC., Scranton, PA (US)

( * ) Notice: Subject to any disclaimer, the term of this patent is extended or adjusted under 35 U.S.C. 154(b) by 0 days.

(21) Appl. No.: 15/224,981

(22) Filed: Aug. 1, 2016

Related U.S. Application Data

(63) Continuation-in-part of application No. 12/384,467, filed on Apr. 3, 2009, which is a continuation of application No. 12/080,482, filed on Apr. 3, 2008, now Pat. No. 7,882,886.

(51) Int. Cl.
*H01R 13/74* (2006.01)
*H01R 25/00* (2006.01)
*H01R 13/627* (2006.01)

(52) U.S. Cl.
CPC ........ *H01R 13/745* (2013.01); *H01R 13/6277* (2013.01); *H01R 25/006* (2013.01)

(58) Field of Classification Search
USPC .......................... 174/660, 661, 655; 439/552
See application file for complete search history.

(56) References Cited

U.S. PATENT DOCUMENTS

| | | | | |
|---|---|---|---|---|
| 3,783,176 | A * | 1/1974 | Lund | ...................... H02G 3/083 |
| | | | | 174/661 |
| 6,352,439 | B1 | 3/2002 | Stark et al. | |
| 6,521,831 | B1 | 2/2003 | Gretz | |
| 6,682,355 | B1 | 1/2004 | Gretz | |
| 7,151,223 | B2 | 12/2006 | Auray et al. | |
| 7,238,894 | B1 | 7/2007 | Gretz | |
| 7,723,623 | B2 | 5/2010 | Kiely et al. | |
| 7,824,213 | B1 * | 11/2010 | Korcz | ................ H01R 13/5816 |
| | | | | 174/64 |

* cited by examiner

*Primary Examiner* — Dhirubhai R Patel

(57) ABSTRACT

A duplex fitting including a radius cast on transition for effectively stopping advancement of the armor layer of one or more inserted cables while at the same time enabling easy passage of the conductors to the outbound end. Two inbound bores transition to a single outlet bore within the fitting. The duplex fitting includes a one-piece connector body having a leading end with a nose portion and a trailing end with two bores therein. Tubular cable retainers secured within the inbound bores snap-in connection of electrical cables to the trailing end. A fastening arrangement on the nose portion of the duplex fitting enables snap fit connection to a knockout hole in a panel or an electrical box.

9 Claims, 11 Drawing Sheets

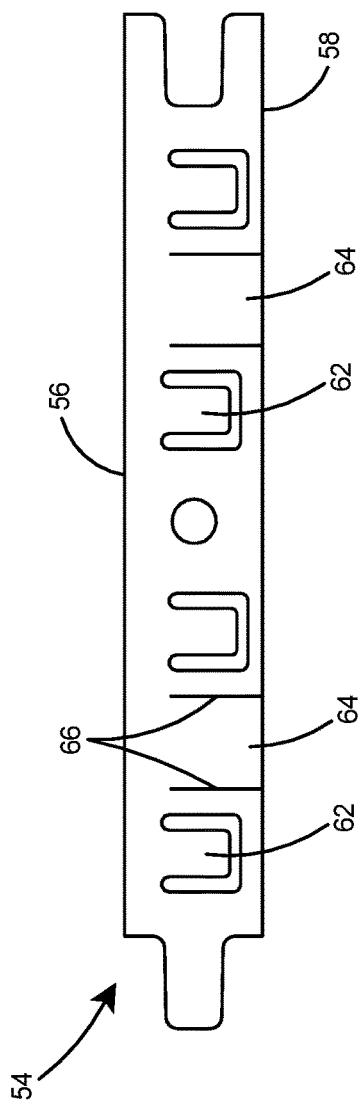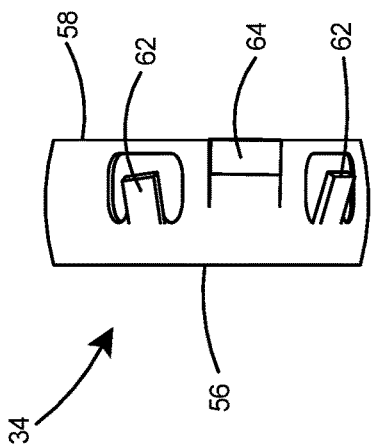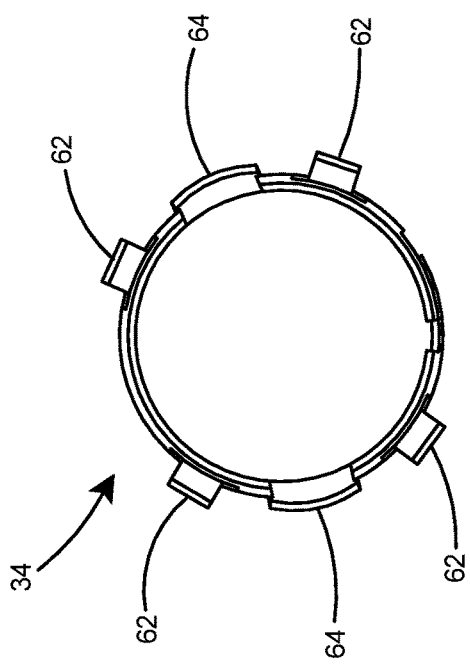

DUPLEX ELECTRICAL CONNECTOR WITH ONE-PIECE CONNECTOR BODY AND RADIUS CAST ON TRANSITION

This application is a Continuation in Part of U.S. patent application Ser. No. 12/384,467, filed Apr. 3, 2009 and still pending, which is a Continuation of U.S. patent application Ser. No. 12/080,482, filed Apr. 3, 2008 and now U.S. Pat. No. 7,882,886, which applications and patents are commonly owned by the assignee of the present invention, the entire contents of which are incorporated herein by reference herein.

FIELD OF THE INVENTION

This invention relates to connectors for connecting electrical cables to a panel and specifically to a duplex electrical fitting with improved internal structure for enabling effortless pass-through of conductors through the internal bores.

BACKGROUND OF THE INVENTION

Duplex electrical fittings are used for wiring electricity in residential and commercial buildings. The duplex fitting enables connecting of one or two electrical cables through a single knockout aperture in an electrical box. In order to properly ground the outer layer of armored electrical cable, duplex fittings are typically constructed of conductive metal and include an inbound end to accept the insertion of electrical cables and an outbound end for connection to an electrical box. Duplex fittings typically include an internal bore that transitions from two bores at the inbound end of to one bore at the outbound end. There is typically scant space available surrounding an electrical box, thereby limiting the length of the duplex fitting as the fitting must fit within the cramped spaces between the electrical box, the walls, and the surround joists or similar structural members.

Although many prior art duplex fittings have been heretofore proposed, one shortcoming of the prior art cables is the difficulty in advancing the conductors thorough the internal structure of the fitting. Accordingly, what is needed is a duplex fitting that provides an easy pathway for advancing the electrical conductors of two inserted electrical cables to the outbound end of the fitting.

SUMMARY OF THE INVENTION

The invention is a duplex fitting having a one-piece connector body for securing electrical cables to a panel or junction box. The one-piece connector body includes a leading end with a nose portion having a bore therein and a trailing end with two bores therein. One or two tubular cable retainers secured in the trailing end enable snap in connection of electrical cables to the trailing end of the connector body. A fastening arrangement is included on the nose portion at the leading end of the connector body for securing the connector body to a knockout hole in a panel or an electrical box. The duplex fitting includes two inbound bores transitioning to a single outlet bore. An end stop at the transition area includes a radius surface thereon to enable the end stop to effectively stop advancement of the armor layer of the cable while at the same time enabling easy passage of the conductors there through to the outbound end.

DESCRIPTION OF THE DRAWINGS

FIG. 6 is a plan view of a blank used to form a cylindrical snap ring fastening arrangement for the leading end of the connector body in FIG. 2.

FIG. 7 is an end view of a cylindrical snap ring that has been formed from the blank of FIG. 6.

FIG. 8 is a side view of the cylindrical snap ring of FIG. 7.

DETAILED DESCRIPTION OF THE INVENTION

Figure 1:
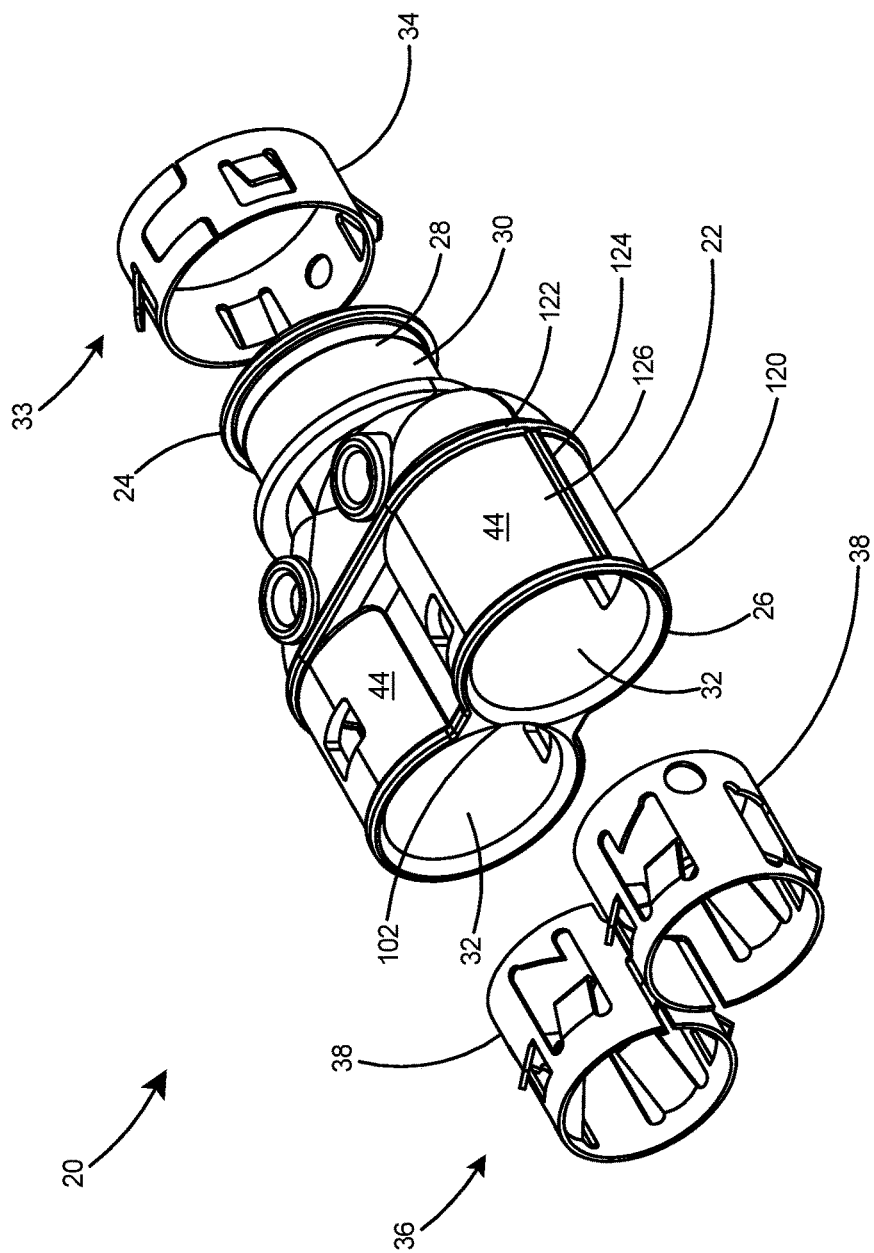
FIG. 1 is an exploded perspective view of a first embodiment of a duplex electrical connector according to the present invention.

With reference to FIG. 1 there is shown a first embodiment of the present invention, a duplex electrical connector 20 with a one-piece die cast connector body 22 having a leading end 24, a trailing end 26, a nose portion 28 with a cylindrical seat 30 on the leading end 24, and two bores 32 in the trailing end 26. A fastening arrangement 33 for fastening the electrical connector 20 to an electrical panel or junction box (not shown) includes a snap ring 34 that is shown exploded away from the leading end 24 and in alignment with the nose portion 28 and the cylindrical seat 30. A cable retaining arrangement 36 includes two cable retaining split rings 38 that are shown exploded away from the trailing end 26 of the connector body 22 with a cable retaining ring 38 in alignment with each of the bores 32 in the trailing end 26.

Figure 2:
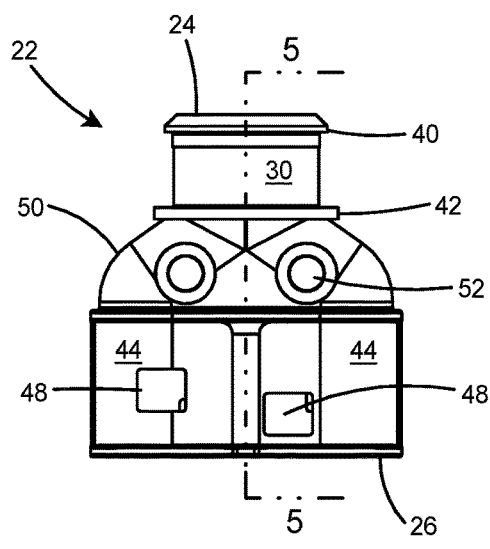
FIG. 2 is a top view of a one-piece connector body that forms a portion of the duplex electrical connector shown in FIG. 1.
Figure 3:
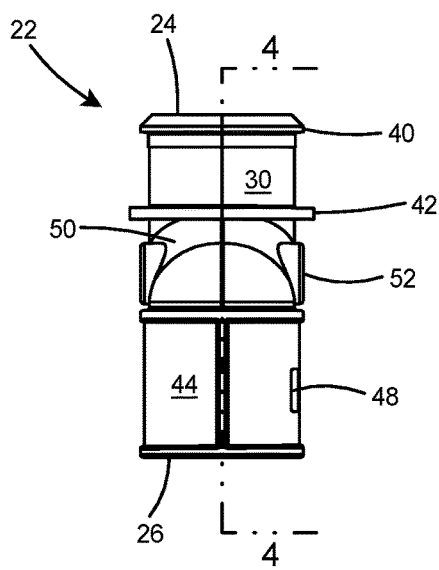
FIG. 3 is a side view of the connector body of FIG. 2.
Figure 4:
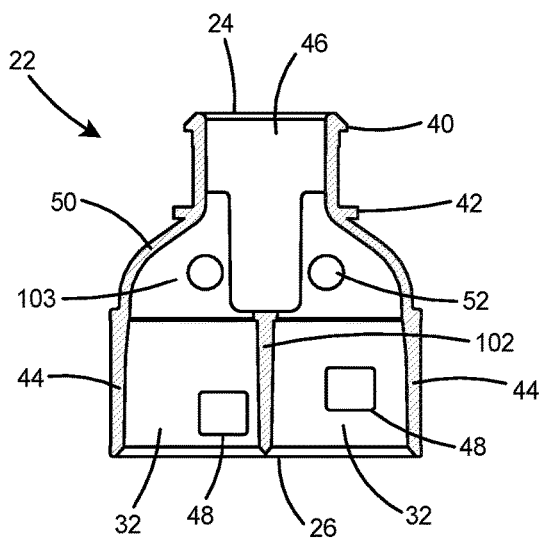
FIG. 4 is a sectional view of the connector body taken along line 4-4 of FIG. 3.
Figure 5:
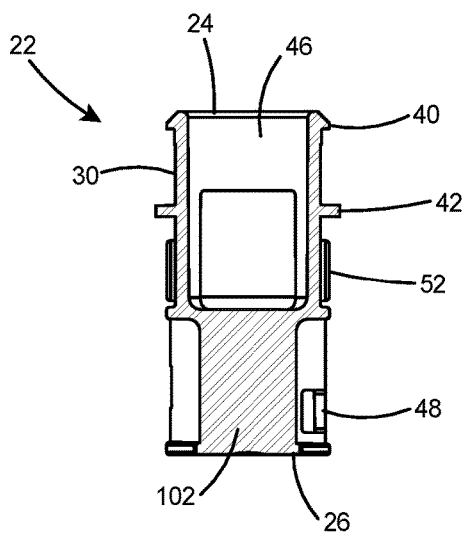
FIG. 5 is a sectional view of the connector body taken along line 5-5 of FIG. 2.

Referring to FIGS. 2-5, the one-piece die cast connector body 22 is die cast in one piece of metal. The connector body 22 includes an end flange 40 on the leading end 24 and an intermediate flange 42 at the end of the nose portion 28. The cylindrical seat 30 extends between the end flange 40 and the intermediate flange 42. The trailing end 26 of the connector body 22 includes a pair of substantially cylindrical wall portions 44 that define the bores 32. As shown in FIG. 4, the connector body 22 is substantially hollow with bores 32 in open communication with leading bore 46 in the leading end 24 of the connector body. Openings 48 are provided in the cylindrical wall portions 44 surrounding each bore 32. Curved shoulders 50 are provided at the transition of the trailing bores 32 to the leading bore 46. Viewports 52 are provided in the shoulder area as shown in FIG. 2.

Referring to FIGS. 6-8, the cylindrical snap ring 34 is a split ring formed from a blank 54 having a leading edge 56 and a trailing edge 58, as shown in FIG. 6, into a substantially cylindrical shape as shown in FIGS. 7 and 8. U-shaped cutouts 60 are punched out of the blank 54 to form locking tangs 62 on the interior of the blank 54. Grounding tangs 64 are defined by slits 66 along the trailing edge 58 of the blank 54. On the cylindrical snap ring 34, as shown in FIGS. 7 and 8, the locking tangs 62 and grounding tangs 64 are bent outwards of the ring 34.

Figure 9:
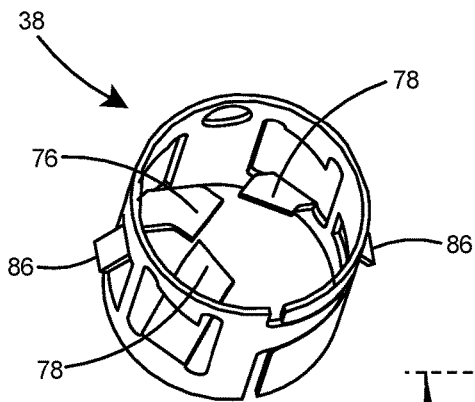
FIG. 9 is a perspective view of a cable retainer that forms a portion of the duplex electrical connector of the present invention.
Figure 10:
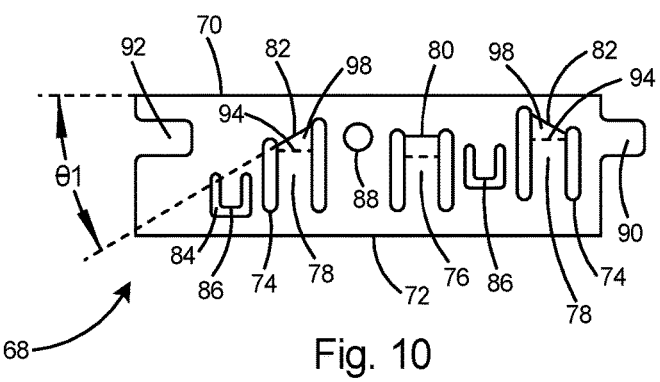
FIG. 10 is a plan view of a blank used to form the cable retainer of FIG. 2.
Figure 11:
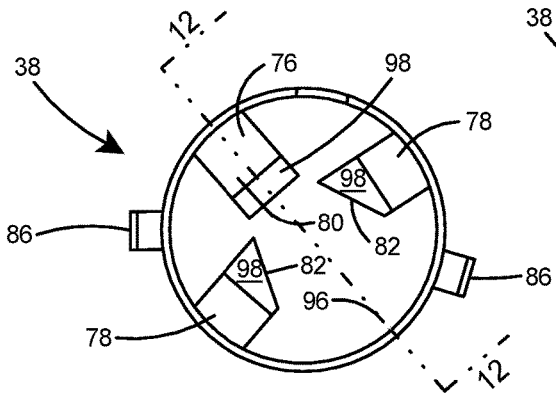
FIG. 11 is an end view of the cable retainer of FIG. 9.
Figure 12:
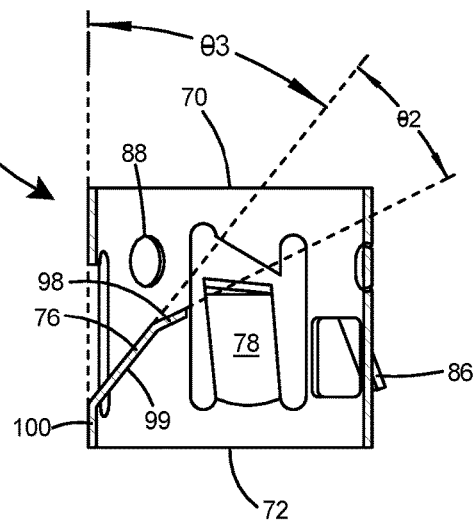
FIG. 12 is a sectional view of the cable retainer taken along line 12-12 of FIG. 11.

With reference to FIGS. 9 and 11-12, there is shown a cable retaining ring 38 that forms a portion of the duplex connector of the present invention. As shown in FIG. 10, the cable retaining ring is formed from a blank 68 having a leading edge 70 and a trailing edge 72. Slots 74 define cable retaining tangs in the blank 68 including a center cable retaining tang 76 and outer cable retaining tangs 78. Center cable retaining tang 76 includes an edge 80 that is parallel with the leading and trailing edges 70 and 72 and outer cable retaining tangs 78 include edges 82 that are sloped in opposite directions at angle θ1 away from leading edge 70. U-shaped slots 84 define outward extending tangs 86. For locking the blank 68 in place in order to form it into the cylindrical shaped cable retaining ring, an aperture 88 is provided in the blank 68. A tab 90 is provided on one end of the blank 68 which will align with a groove 92 on the opposite end of the blank 68 when the blank is formed into the cylindrical cable retaining ring 38. The outer tangs 78 include bend lines 94.

As shown in FIGS. 11 and 12, the level edge 80 on center cable retaining tang 76 and the sloped edges 82 on the outer cable retaining tangs 78 will act to force an inserted electrical cable (not shown) toward a point 96 on the inside of the cable retaining ring 38 that is opposite the center cable retaining tang 76. As shown in FIG. 12, the cable retaining tangs 76 and 78 include end portions 98 that are bent away at angle θ2 from the base portion 99 of the center cable retaining tang 76. Preferably, end portions 98 of both center cable retaining tang 76 and end portions 98 of outer cable retaining tangs 78 are each bent at an angle θ2 of between 20 and 30 degrees from the base portion 99 of the respective tang. Cable retaining tangs 76 and 78 are preferably each bent at an angle θ3 of between 35 and 45 degrees from the sidewall 100 of the cable retaining ring 38.

Preferably the connector body 22 of the present invention is die cast of metal in one piece and most preferably constructed of ZAMAK™, a casting alloy comprised mainly of zinc alloyed with aluminum, magnesium, and copper and available from Eastern Alloys, Maybrook, N.Y. By constructing the tubular body of ZAMAK™ or other appropriate metals, the connector body 22 will be electrically conductive and provide good continuity throughout the fitting. The snap ring 34 and cable retaining ring 38 are preferably constructed of spring steel to impart toughness and flexibility to the various tangs located thereon. The electrical connector 20 is used to secure electrical cables such as metal clad (MC), metal clad all purpose (MCAP), flex cable, or continuous corrugated MC cables to a panel.

Figure 13:
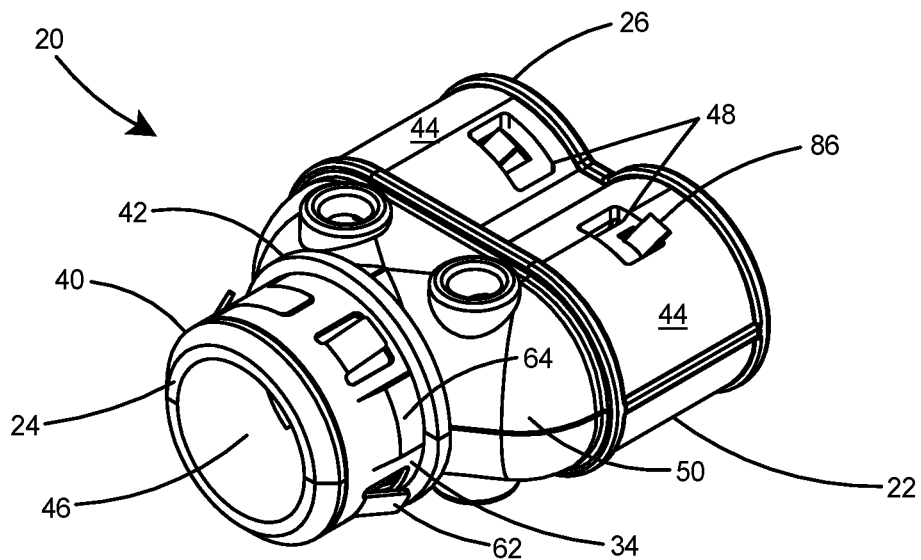
FIG. 13 is a perspective view of the duplex electrical connector of the present invention from the leading end of the connector.
Figure 14:
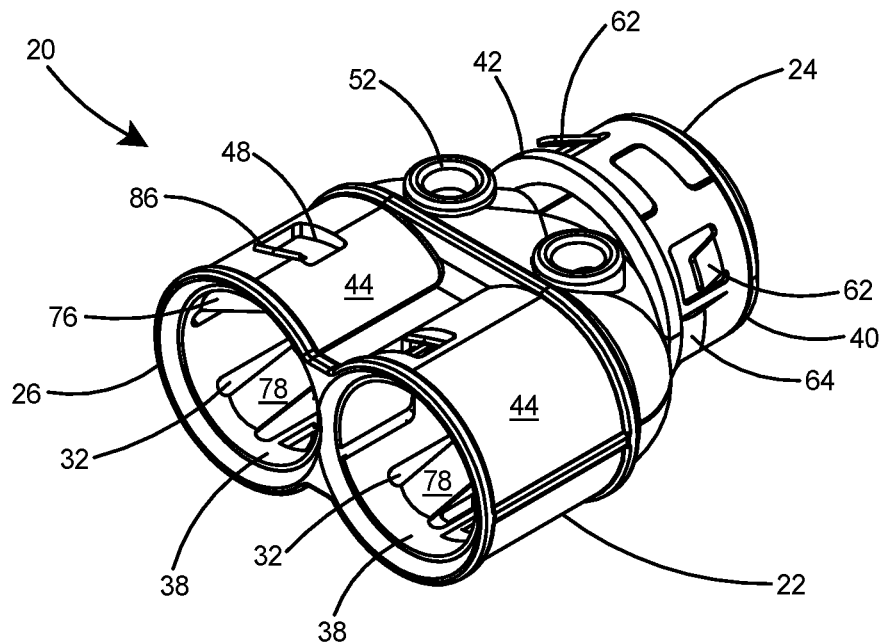
FIG. 14 is a perspective view of the duplex electrical connector of the present invention from the trailing end of the connector.

With reference to FIGS. 13 and 14, the assembled duplex electrical connector 20 with one-piece connector body 22 in a perspective view from the leading end 24 (FIG. 13) and a perspective view from the trailing end 26 (see FIG. 14). Snap ring 34, being constructed of flexible spring steel, is expanded from its unbiased condition and slipped over end flange 40 after which it contracts to its unbiased condition and seats on the leading end 24 of the one-piece connector body 22. The cable retaining rings 38 in an unbiased condition are of a slightly larger diameter than the trailing bores 32 in the trailing end 26 of the connector body 22. To assemble the duplex connector 20, the cable retaining rings 38 are aligned such that the outward extending tangs 86 on the cable retaining rings 38 are in alignment with the openings 48 in the cylindrical walls 44 of the connector body 22. The cable retaining rings 38 are then compressed slightly and slipped into the respective bores 32 in the connector body 22. The assembled duplex electrical connector 20 thus includes the one-piece die cast connector body 22 with a snap ring 34 securely seated on the leading end 24 and two cable retaining rings 38 securely seated within the bores 32 on the trailing end 26 of the connector body 22.

Operation of the duplex electrical connector 20 of the present invention is very simple. As a result of the snap ring 34 on the leading end 24 of the connector body 22 and the cable retaining rings 38 in the trailing end 26 of the connector body 22, an installer simply pushes an electrical cable (not shown) into each of the bores 32 of the trailing end 26 of the duplex connector 20. The cable retaining tangs 76 and 78 in each bore 32 engage the electrical cable and hold the cable securely within the connector body 22. After the electrical cables are inserted, the leading end 24 of the duplex connector 20 is inserted within a knockout hole in a panel or junction box (not shown) and simply pushed until locking tangs 62 clear the wall of the panel or junction box and snap outward to their unbiased position. With locking tangs 62 sprung outward, the leading end 24 of the duplex connector 20 is held securely to the panel or junction box. As the connector body 22 is die cast in one piece and the snap ring 34 and cable retaining rings 38 are all constructed of metal, the duplex electrical connector 20 of the present invention establishes excellent electrical continuity between the electrical cables and the panel or junction box that it is secured to.

Prior to the present invention, conventional duplex connector bodies (not shown) with dual bores on the trailing end for accepting cable retaining rings were formed in two pieces as a method was not available for die casting the connector body in one piece. As shown in FIGS. 1 and 4, connector body 22 is die cast in one piece, including dividing wall portion 102 which is a portion of cylindrical wall portions 44 that form the bores 32 in the trailing end 26 of the connector body 22. The one piece die cast connector body 22 leads to the myriad advantages as described hereinabove in this specification including 50% savings in raw material cost per connector body, elimination of several expensive secondary manufacturing steps, elimination of flash on the interior of the connector body, improvement of electrical continuity, and a reduction in the amount of tooling to produce the duplex connector body.

Figure 15:
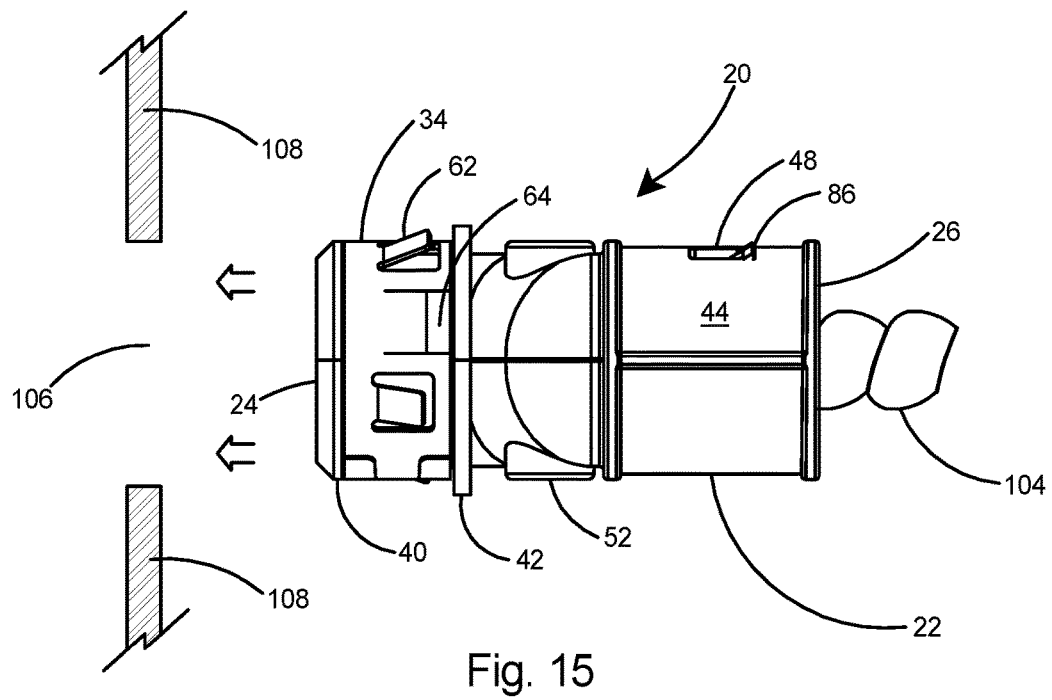
FIG. 15 is a side view of the duplex electrical connector of the present invention with cables inserted in the trailing end and with the leading end in alignment with a knockout aperture in a panel.

With reference to FIG. 15 there is shown a side view of the duplex electrical connector 20 of the present invention with electrical cables 104, one of which is in view, inserted in the trailing end 26 and with the leading end 24 in alignment with a knockout aperture 106 in an electrical panel 108. After electrical cables 104 are inserted into the trailing end 26 of the duplex connector 20, the leading end 24 is inserted through the knockout aperture 106 and advanced until locking tangs 62 clear the panel 108 and snap outward, thereby locking and securing the duplex connector 20 tightly and with excellent electrical continuity to the panel 108.

Figure 16:
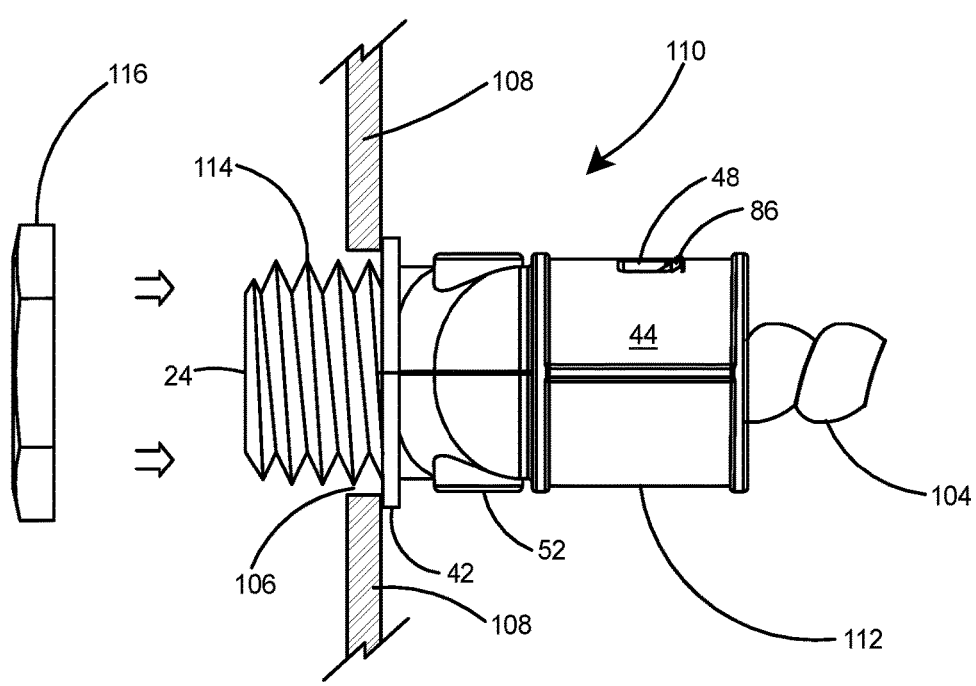
FIG. 16 is a side view of an alternate embodiment of the duplex electrical connector of the present invention with cables inserted in the trailing end and with the leading end in alignment with a knockout aperture in a panel.

Referring to FIG. 16 there is shown a side view of an alternate embodiment of the duplex electrical connector 110 of the present invention. The alternate embodiment of the duplex connector 110 includes a one-piece connector body 112 having threads 114 on the leading end 24. The duplex connector 110 is depicted with electrical cables 104 inserted in the trailing end 26 and with the leading end 24 in alignment with a knockout aperture 106 in a panel 108. Duplex electrical connector 110 is simply inserted through the knockout aperture 106 and a locknut 116 is threaded on the threads 114 at the leading end 24 of the connector to secure the connector 110 to the panel 108. The trailing end 26 of duplex electrical connector 110 is identical to the trailing end of the first embodiment and accepts electrical cables 104 in the same manner as the first embodiment.

Figure 17:
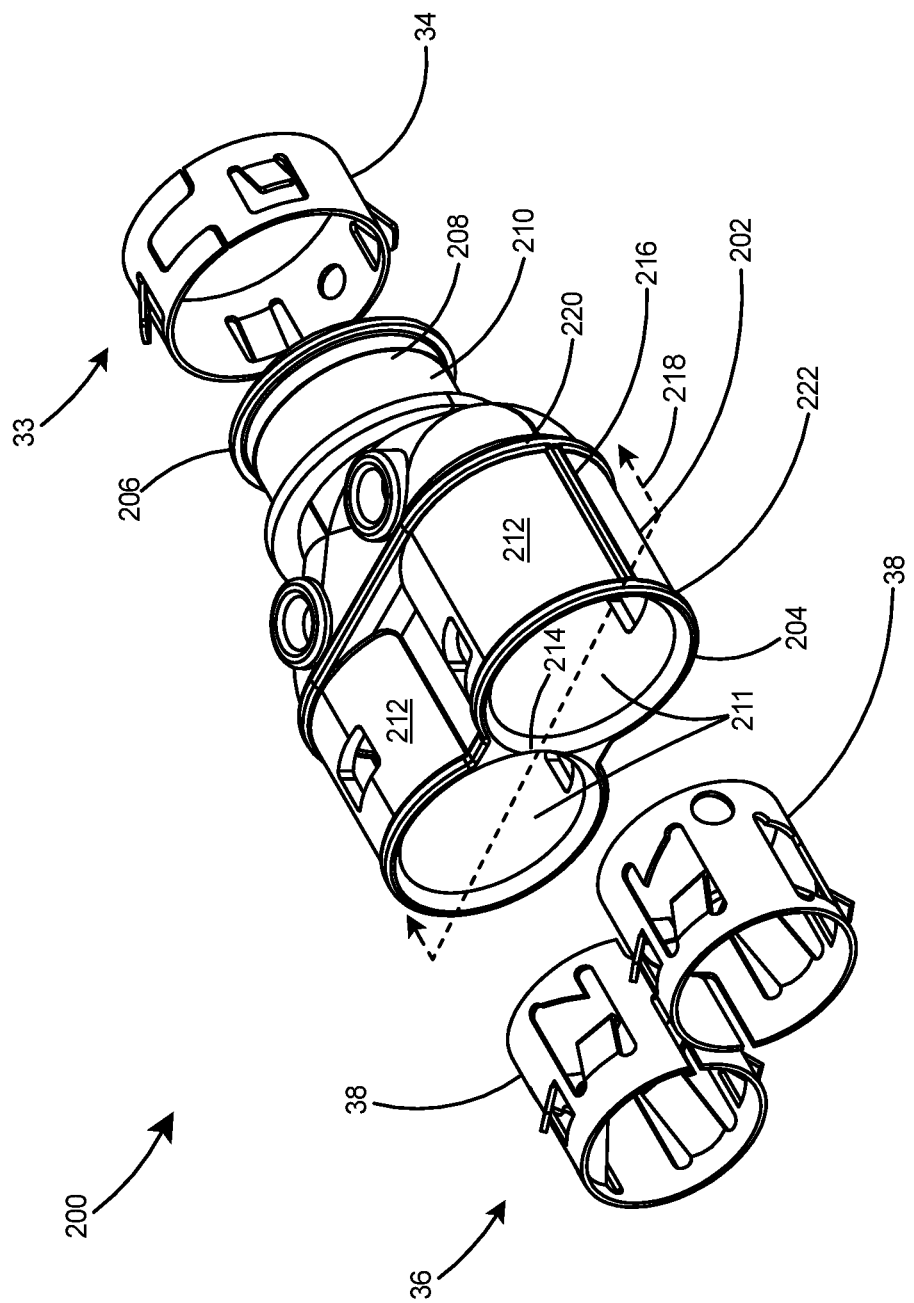
FIG. 17 is an exploded perspective view of a second and preferred embodiment duplex fitting according to the present invention.
Figure 18:
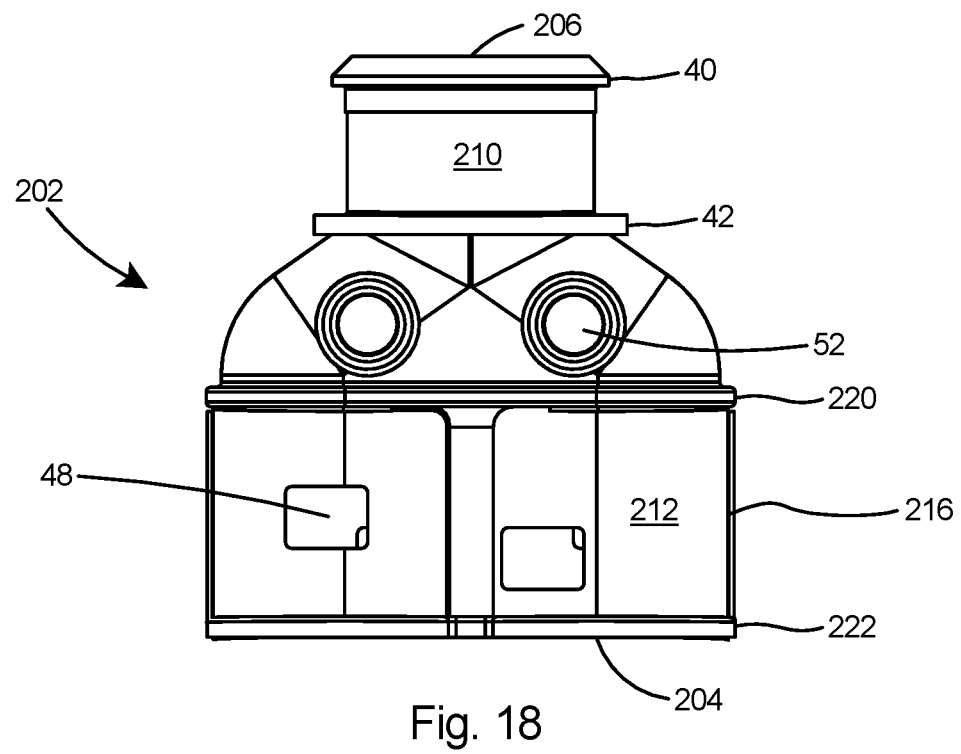
FIG. 18 is a top view of a second and preferred embodiment of a one-piece connector body according to the present invention.
Figure 19:
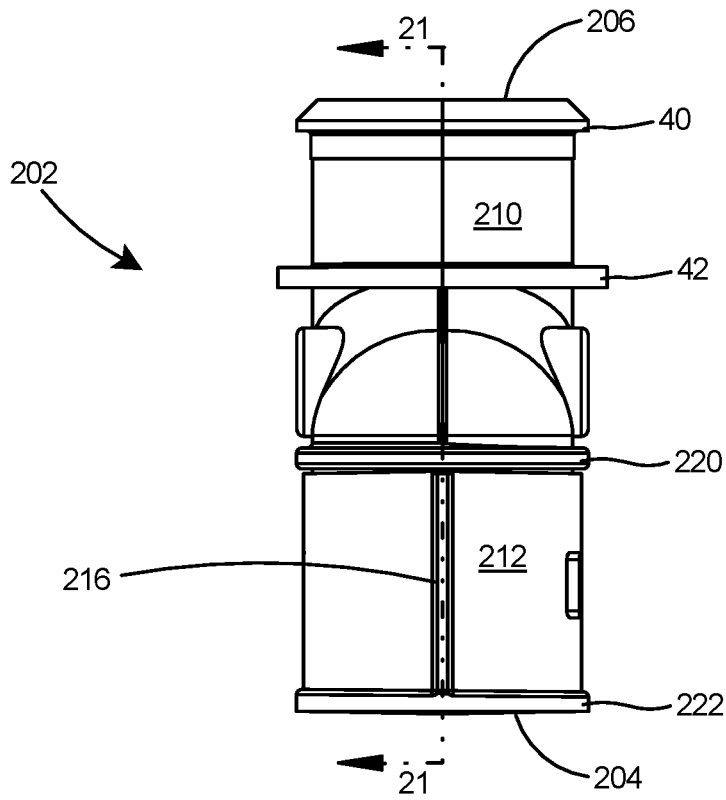
FIG. 19 is a side view of the connector body of FIG. 17.

With reference to FIG. 17 there is shown a second and preferred embodiment of a duplex fitting 200 according to the present invention. The duplex fitting 200 includes a connector body 202 having an inbound end 204, an outbound end 206, and a nose portion 208 with a reduced diameter seat 210. Connector body 202 includes two inbound bores 211 defined by tubular inbound walls 212 and dividing wall 214. A reinforcing rib 216 extends longitudinally along the tubular inbound walls 212. Reinforcing ribs 216 are aligned with the plane 218 dissecting the side-by-side inbound bores 210. The connector body 22 includes a mid-body flange 220 and an inbound end flange 222. Each reinforcing rib 216 extends from the mid-body flange 220 to the inbound end flange 222. A fastening arrangement 33 for fastening the duplex fitting 200 to an electrical panel or junction box include snap ring 34, that is shown in alignment for insertion on reduced diameter seat 210 of nose portion 208. A cable retaining arrangement 36 includes a cable retaining ring 38 for insertion in each inbound bore 211.

Figure 20:
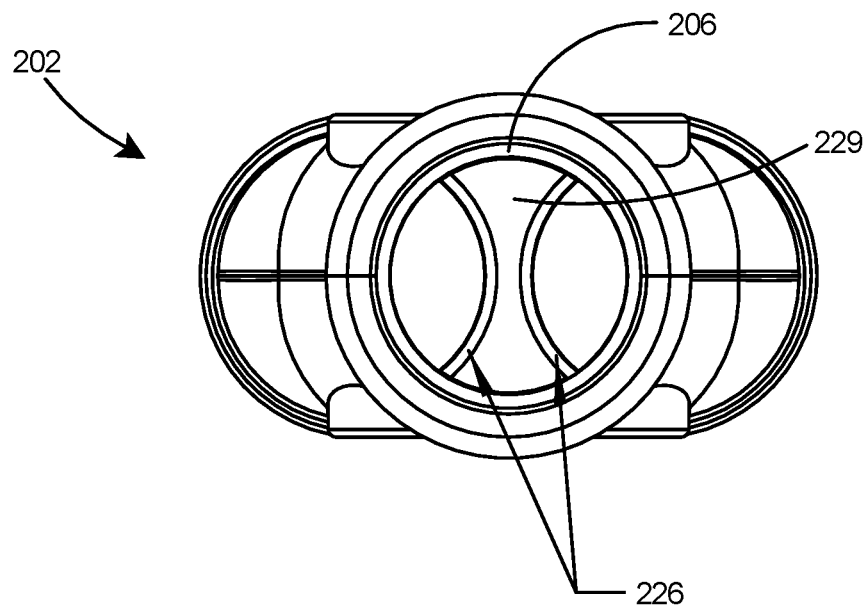
FIG. 20 is an end view of the connector body as viewed from the top of FIG. 17.
Figure 21:
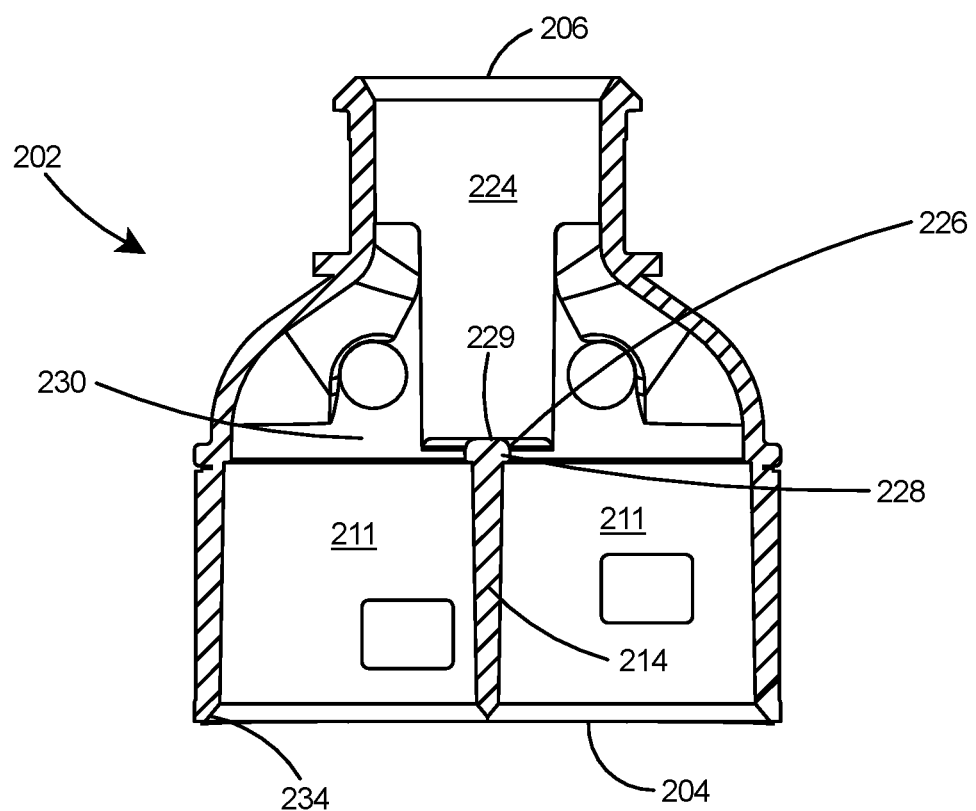
FIG. 21 is a sectional view of the connector body taken along line 21-21 of FIG. 18.
Figure 22:
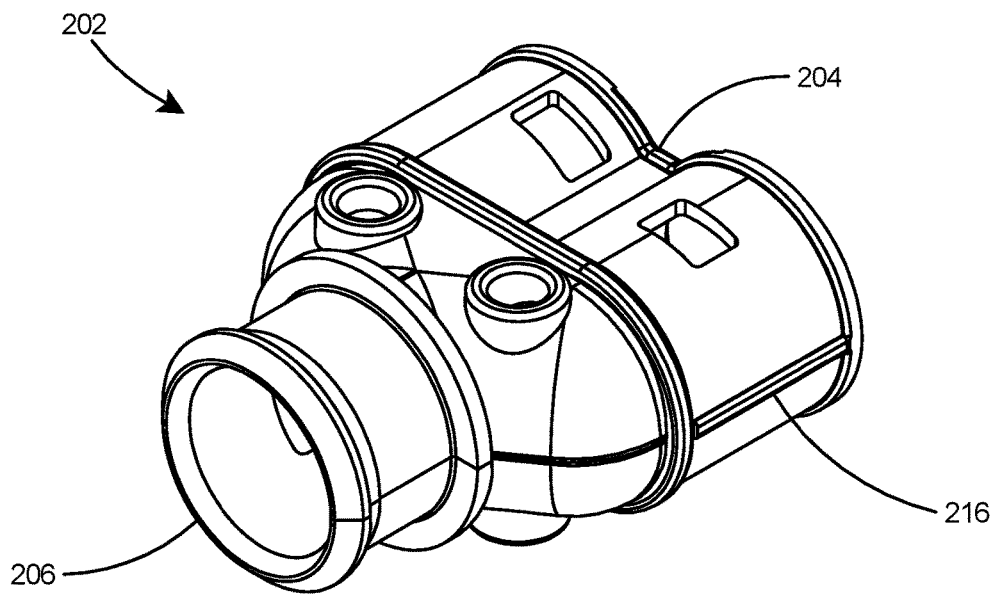
FIG. 22 is an isometric view of the connector body of FIG. 17 as viewed from the leading end.
Figure 23:
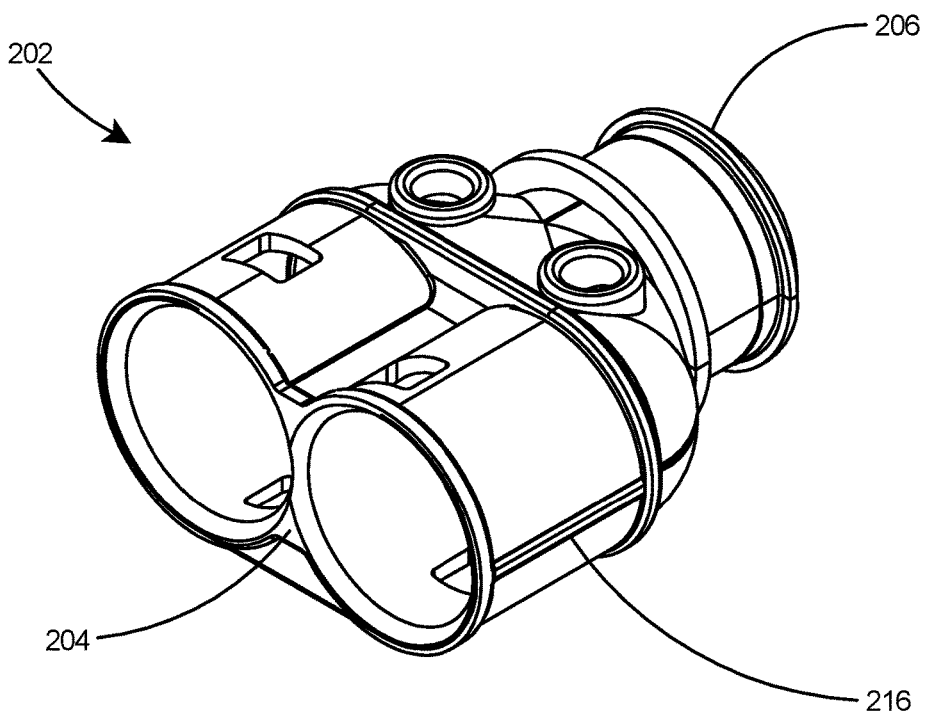
FIG. 23 is an isometric view of the connector body of FIG. 17 as viewed from the trailing end.
Figure 24:
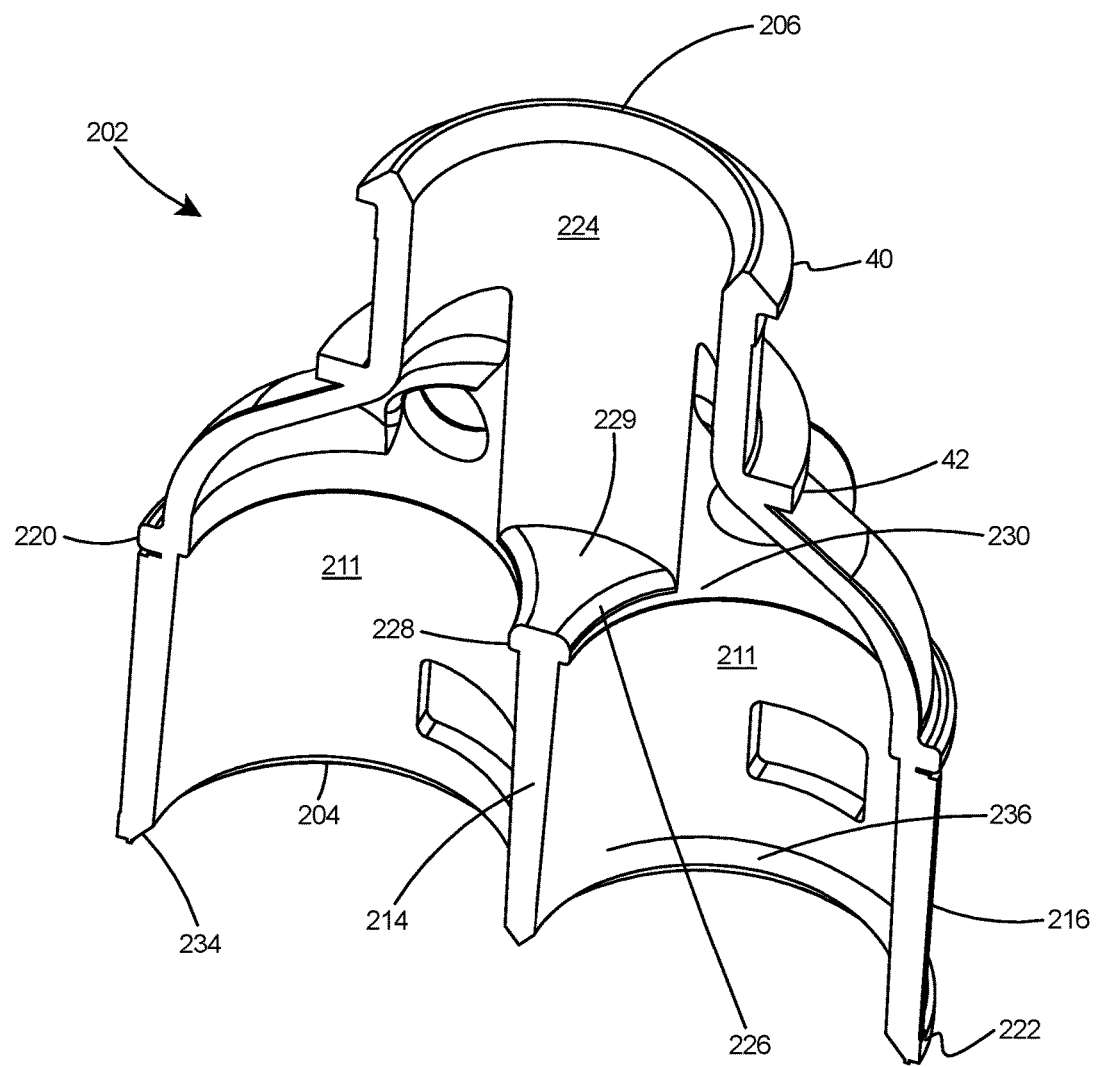
FIG. 24 is an isometric view of the interior half of the connector body taken along line 20-20 of FIG. 18.

Unfortunately, as a result of the compact length, the transition from two bores to one bore within the short length of duplex fittings, and the need to stop the forward advance of the cable's armor at the transition, the conductors of electrical cables tend to hang up in prior art duplex fittings. As shown in FIGS. 20, 21, and 24, a critical feature has been provided to enable the conductors pass through the transition from inbound bore 211 to outbound bore 224. To provide easier pass through of conductors, a radius or arcuate edge 226 has been provided on the end stop 228 at the outbound end 229 of dividing wall 214. The arcuate edge 226, as shown in FIG. 24, has provided unexpected results in that conductors pass much more easily through the transition area 230. Thus conductors are much less likely to hang up in the interior of the connector body 202 at the transition from the inbound double bores 211 to the outbound single bore 224. Connector body 202 further includes a chamfer 234 extending around the inner periphery 236 of the inbound bores 211 to facilitate insertion of cable retaining rings 38 during assembly of the duplex fitting.

Although the description above contains many specific descriptions, materials, and dimensions, these should not be construed as limiting the scope of the invention but as merely providing illustrations of some of the embodiments of this invention. Thus the scope of the invention should be determined by the appended claims and their legal equivalents, rather than by the examples given.

What is claimed is:

1. A duplex fitting for connection of electrical cables to an electrical box comprising:
    a tubular connector body including a nose portion, two inbound bores and a transition area leading to an outbound bore;
    a dividing wall separating said inbound bores, said dividing wall including an outbound end;
    an end stop at the outbound end of including an edge at the transition area;
    an arcuate edge on said end stop;
    said connector body including an inbound end and an outbound end;
    a snap ring on said nose portion of said connector body; and
    a cable retaining ring secured in each of said inbound bores of said connector body.

2. The duplex fitting of claim 1 wherein said fastening arrangement further comprises:
    a cylindrical seat on said nose portion on said outbound end of said connector body; and
    said snap ring seated on said cylindrical seat of said nose portion.

3. The duplex fitting of claim 1 wherein said fastening arrangement further comprises:
    threads on said outbound end of said connector body; and
    a locknut for engaging said threads.

4. The duplex fitting of claim 1 further comprising:
    an inner periphery on each of said inbound bores; and
    a chamfer extending around the inner periphery of said inbound bores.

5. The duplex fitting of claim 1 wherein each of said cable retaining rings comprises an outward extending tang.

6. The duplex fitting of claim 1 wherein each of said cable retaining tangs is a split ring.

7. The duplex fitting of claim 1 wherein said snap ring is a split ring.

8. The duplex fitting of claim 1 further comprising:
    tubular inbound walls defining said inbound bores; and
    a reinforcing rib extending longitudinally along the tubular inbound walls.

9. The duplex fitting of claim 8 wherein said reinforcing ribs are aligned with the plane dissecting the side-by-side inbound bores.

* * * * *